United States Patent Office 2,963,449
Patented Dec. 6, 1960

2,963,449

METHOD FOR ACTIVATING A CATALYST

William G. Nixon, Westchester, Ill., assignor, by mesne assignments, to Universal Oil Products Company, Des Plaines, Ill., a corporation of Delaware No Drawing. Filed Jan. 22, 1957, Ser. No. 635,082

10 Claims. (Cl. 252—466)

The present application is a continuation-in-part of my co-pending application Serial Number 595,860, filed July 5, 1956, and now abandoned.

The present invention relates to a method for activating a catalytic composite and is specifically directed to a method of activating a catalytic composite comprising a metal component and a refractory oxide.

Metal-containing catalytic composites have attained extensive use commercially, and industries such as the pharmaceutical, detergent, petroleum, insecticidal, etc. utilize metal-containing catalysts to promote a multitude of reactions among which are hydrogenation, cyclization, cracking, polymerization, dehydrogenation, sulfonation, alkylation, hydrocracking, oxidation and isomerization. Whatever the industry and reaction, it is extremely essential for commercial acceptance that the particular catalyst therein employed exhibit a high degree of activity, and prolonged capability to perform its intended function.

The mechanism of catalysis is not fully understood and, therefore, it is extremely difficult to predict, without experimentation, the final results of any process which utilizes a particular catalyst. The manufacture of catalyst is equally unpredictable from the standpoint of producing an acceptable catalyst having a desired activity. For the most part, the manufacture of catalyst is an art rather than an exact science. The best manufacturing method quite often produces a catalyst which is unacceptable due to a low degree of activity, and a precise combination of chemical and physical conditions is necessary in the manufacturing process. Regardless of the final composition of the finished catalyst, there is a high degree of criticalness attached to each and every phase of the manufacturing process. For example, in any phase of the process which might involve the commingling of two or more substances, it is not only critical that each substance be present in the required amount, but that the commingling be performed at precise conditions. Such criticality effects the manufacturing cost to a great extent.

Catalyst is generally produced in individual batches, and regardless of the method of manufacture, it is necessary to sample and test each and every batch for activity, and some batches are found thereby to be unacceptable due to a degree of activity which is less than that desired or necessary. This procedure tends to create many unnecessary costs since those batches of catalyst which are found to be unacceptable must be reprocessed. The additional costs which are inherent in reprocessing may actually be twofold: first, the constituents must be reverted to a state such that their reuse is possible, and second, the processing procedure must be repeated.

The object of the present invention is to provide a method of producing a catalyst having a high degree of activity, by eliminating the uncertainty and criticalness in manufacturing and, therefore, doing away with costly activity testing and reprocessing procedures.

In one embodiment the present invention relates to a method for activating a metal component-refractory oxide catalytic composite which comprises treating said composite with an oxide of nitrogen.

In another embodiment the present invention relates to a method for activating a metal component-refractory oxide catalytic composite which comprises treating said catalyst, in the presence of halogen, with an oxide of nitrogen, removing said oxide of nitrogen from said composite, and thereafter subjecting the composite to a reducing treatment.

In a specific embodiment the present invention relates to a method for activating a platinum-alumina-chloride catalytic composite which comprises subjecting said composite to a drying treatment, thereafter treating said dried composite at a temperature in excess of 25° C. with an oxide of nitrogen, removing said oxide of nitrogen from said composite by sweeping with air, and thereafter subjecting said catalyst to a reducing treatment effected at a temperature in excess of 25° C.

As hereinbefore set forth, catalysts are employed throughout industry in a multitude of processes. A great majority of these catalysts comprise a metal component, and catalysts have been made which comprise combinations of two or more metal components. In the interest of simplicity, the following discussion will be limited to activating those catalytic composites comprising platinum and/or palladium.

Although the method of the present invention is specifically directed to catalytic composites containing platinum and/or palladium, catalytic composites containing other metals can be improved through its use. Other metals can be composited with a refractory inorganic oxide and subsequently employed therewith as components of a catalyst, with or without platinum or palladium present, and these catalysts can be improved by the method of the present invention. Catalytic composites which can be improved by the method of the present invention comprise metal components such as, but not limited to, cesium, vanadium, chromium, tungsten, cobalt, copper, sodium and other alkali metals, silver, iridium, rhodium, rhenium, ruthenium, molybdenum, nickel, osmium, other metals of groups VI and VIII of the periodic table, mixtures of two or more, etc. The metal component may exist either in the elemental state or in combination as the halide, oxide, nitrate, sulfate, etc.

Generally, the amount of the metal component composited with the catalyst is small compared to the quantities of the other components combined therewith. For example, platinum and/or palladium will generally comprise from about 0.01% to about 5% by weight of the total catalyst, and usually from about 0.1% to about 1% by weight. The use of other metal components, with or without platinum and/or palladium, is dependent upon the use for which the particular catalyst is intended. In any case, however, the concentrations of the metal components will be small, and will generally be within the range of from about 0.01% to about 5% by weight of the total catalyst.

Halogen is generally composited with the catalyst in concentrations of from about 0.01% to about 8% by weight of the total catalyst and may be either fluorine, chlorine, iodine, bromine or mixtures of the same. In general, fluorine appears to be less easily removed from the catalyst during the process in which the catalyst is employed and is, therefore, preferred in many instances. It is understood that the halogen may comprise a mixture of two or more of the aforementioned halogens: a particularly preferred mixture comprises fluorine and chlorine. The halogen is combined with one or more of the other components of the catalyst, and is generally referred to as combined halogen.

Whatever the metal component, it is generally composited with a highly refractory inorganic oxide such as alumina, silica, zirconia, magnesia, boria, thoria, strontia, etc., and mixtures of two or more including silica-alumina, alumina-boria, silica-thoria, silia-alumina-zirconia, etc. It is understood that the refractory inorganic oxides hereinabove set forth are intended to be illustrative rather than limiting unduly the method of the present invention. It is further understood that these refractory inorganic oxides may be manufactured by any suitable method including separate, successive, or co-precipitation methods of manufacture, or they may be naturally occurring substances such as clays or earths which may or may not be purified or activated with special treatment.

The catalyst composite of the present invention may be made in any suitable manner including separate, successive or co-precipitation methods. For example, alumina may be prepared by adding a suitable alkaline reagent such as ammonium hydroxide to a salt of aluminum such as aluminum chloride, aluminum nitrate, etc., in an amount to form aluminum hydroxide which, upon drying, is converted to alumina. The alumina may be formed into any desired shape such as spheres, pills, powder, granules, etc. A preferred form of alumina is the sphere and alumina spheres may be continuously manufactured by passing droplets of an alumina sol into an oil bath maintained at an elevated temperature, retaining the droplets in said oil bath until the droplets set to hydrogel spheres. The spheres are continuously withdrawn from the oil bath and immediately thereafter subjected to specific aging treatments to impart certain desired physical characteristics to said spheres.

The halogen may be added to the catalyst in any suitable manner and either before or after the formation of the refractory inorganic oxide. While halogen may be added as such, the halogen may also be added as an aqueous solution of a hydrogen halide or an aluminum halide. In the preferred method, the halogen is added to the refractory oxide before the other components are composited therewith. When alumina is the selected refractory oxide, the halogen is preferably incorporated into the alumina before forming into particles. This may be accomplished by the use of an acid such as hydrogen chloride, hydrogen bromide and/or hydrogen iodide. In some cases, volatile salts such as ammonium fluoride, ammonium chloride, ammonium bromide, etc. may be employed. In other cases the alumina may be prepared from the aluminum halide such as aluminum chloride, aluminum fluoride, etc. which affords a convenient method of compositing the halogen while manufacturing the alumina.

In some instances, it may be desired to treat the preformed alumina spheres either prior to, or while combining the metal component therewith. Various reagents may be added to the catalytic composite during the manufacturing process without removing such composites from the scope of the present invention. Reagents which may be added include mineral acids, oxalic acid and other organic acids, alkaline solutions such as ammonium hydroxide, acid-salt solutions such as aluminum nitrate, aluminum halides, aluminum sulphate, hydroben halides, alcohols, amides, amines, aminophenols, etc.

Whatever the method of manufacture, or the materials and reagents used in said method, the catalytic composite so produced may be improved, both in stability and in the degree of activity, by the method of the present invention. As hereinbefore stated, the present invention provides a method for insuring a highly active catalyst through a specific treatment with an oxide of nitrogen at a particular stage of the manufacturing process. I have found that treating a catalytic composite with an oxide of nitrogen prior to high-temperature oxidation and the subsequent reducing treatment yields a catalyst having a degree of activity heretofore not obtained.

The oxides of nitrogen, $N_2O$, $NO$, $NO_2$, $N_2O_3$, $N_2O_4$, and/or $N_2O_5$, need not necessarily be employed per se: they may be utilized in a single treatment as a mixture comprising two or more, or successive treatments employing two or more different oxides of nitrogen may be used. Said oxides of nitrogen may be admixed with various diluents such as, but not limited to, air, nitrogen, carbon dioxide, etc. As hereinbefore stated, halogen is preferably present, and the presence of water also appears to be beneficial. Said oxides of nitrogen may result from other compounds and mixtures which either yield the same at reaction conditions, or form them in situ. It is understood that the oxides of nitrogen do not necessarily yield equivalent results, and different oxides of nitrogen may be employed with different metal-containing catalytic composites.

Although a marked improvement in activation has been observed in the absence of halogen, the preferred method of activating the catalytic composite is that which employs halogen. The use of chlorine and/or bromine is preferred, although fluorine and iodine may be utilized, not necessarily with equivalent results. Any suitable concentration of halogen, from an amount which yields a marked improvement, to an amount which is uneconomically in excess, may be used, however, it is preferred that said halogen be present in excess of 0.01% by weight of the refractory inorganic oxide.

In accordance with the present invention, the halogen may be added in any suitable manner. Said added halogen may exist either in the elemental state or in some combined form such as the halide such as, but not limited to, hydrogen chloride, carbon tetrachloride and alkyl halides such as ethyl chloride, propyl chloride, methyl chloride, butyl chloride, etc. As hereinbefore set forth in a specific embodiment, said halogen may be a component of the catalyst which is to be activated. It is further understood that said halogen may comprise mixtures of two or more of the halides, whether as components of the catalyst, or as halogen which is to be added.

To further improve the activity of the catalyst, it is desirable to subject said catalyst to a reducing treatment. Prior to said reducing treatment, it is preferred that the catalyst is stripped of the oxide of nitrogen by being subjected to a sweeping treatment. The sweeping or stripping agent may be any gaseous substance with which the oxide of nitrogen does not react to form a substance having a detrimental effect upon the catalyst, or which is in itself detrimental to the catalyst. Examples of suitable sweeping agents are the following: air, nitrogen, carbon dioxide, mixtures of the same, etc.

Briefly, the preferred method of activating a catalytic composite, such as a platinum-alumina-chloride catalyst, by the process of the present invention, comprises subjecting said catalyst to the action of an oxide of nitrogen after said catalyst has been composed and dried, but prior to any high-temperature oxidation or reducing treatments. The composite, after all the catalytic components have been combined therewith, exists usually in a wet state, containing a substantial quantity of water remaining from the various impregnating solutions. The water may be removed effectively by drying the catalyst at any suitable temperature within the range of from about 25° C. to about 600° C. It is preferred, however, to remove the water at the lower temperatures in order to avoid the sudden evolution of gas, resulting thereby in the destruction of the structure of the catalyst. Thus, it is preferred to dry the composite at a temperature of from about 50° C. to about 100° C.

The dried platinum-alumina-chloride catalyst is subjected to the action of an oxide of nitrogen at a temperature in excess of 25° C. with an upper limit of about 1000° C., the preferred temperature being within the range of from about 150° C. to about 650° C. The treatment with an oxide of nitrogen is followed by sweeping the composite with air to remove traces of the oxide of nitrogen, and thereafter, said catalytic composite is subjected to a reducing treatment at a temperature in excess of 25° C., with an upper limit of about 1000° C. The preferred method employs a temperature of from about 150° C. to about 650° C. for the various treatments.

It is understood that the present invention is applicable, and will impart high activity, to pre-oxidized catalytic composites. As hereinbefore stated, it is preferred, to afford the greatest advantage, to treat an un-oxidized catalytic composite with an oxide of nitrogen, and of these, the use of NO is particularly preferred.

It is further understood that the method of this invention may employ downflow or upflow in a closed vessel, or countercurrent or concurrent flow through a fixed, fluidized or continuously moving bed of catalyst.

The following examples are introduced to futrher illustrate the utility of the present invention and are not intended to limit the same to the specific materials and conditions involved.

EXAMPLE I

An alumina base was prepared from a mixture of equal volumes of a 28% by weight solution of hexamethylene tetramine in water and an aluminum chloride sol containing 12% by weight aluminum and 10.8% by weight chloride. The mixture was formed into spheres by the oil-drop method, and the spheres were washed, dried to a temperature of 650° C. and then calcined at 650° C.

130 grams of the calcined spheres were soaked in 229 milliliters of a water solution which contained 99 milliliters of chloroplatinic acid.

The spheres were dried and subjected to oxidation effected at a temperature of 500° C. The platinum-alumina-chloride catalyst was analyzed, and found to comprise 0.80% by weight chloride and 0.67% by weight platinum, based on alumina.

A sample of the platinum-alumina-chloride catalyst made as described above, was divided into two portions. A first catalyst portion, to be used as a standard, was subjected to an activity test which comprises of first reducing the catalyst in hydrogen at 500° C. and at atmospheric pressure, then passing n-heptane over said first catalyst portion at a temperature of 325° C., a liquid hourly space velocity of 2.4 (liquid hourly space velocity is defined as the volume of liquid charged per hour per volume of catalyst), and in an atmosphere of hydrogen equivalent to a 10:1 molal ratio of hydrogen to n-heptane. The volume percent conversion of n-heptane to toluene under the above conditions is indicative of the activity of the catalyst. The above described activity test was selected intentionally in view of its severity, and therefore, small changes in small numbers are highly significant.

A second portion of the platinum-alumina-chloride catalyst was subjected to the method of the present invention by being placed in a furnace tube and subsequently brought to a temperature of 500° C. A stream of $NO_2$ was passed through the furnace tube at a rate of 50 cc./hr. for a period of about five minutes, followed by a stream of air at 500° C. for a period of one hour to remove traces of $NO_2$. The catalyst was then subjected to a reducing treatment at a temperature of 500° C. in a stream of hydrogen for a period of one hour. The furnace tube was then cooled, the catalyst removed and then subjected to the test for activity as hereinbefore defined.

The results of the activity tests clearly illustrate the benefit derived from employing the present invention. In addition to the activity test, the two portions of catalyst were analyzed by X-ray diffraction to determine the crystallite size of the metal component. Also, both portions were subjected to a test to determine the quantity of carbon monoxide adsorbed under a standard set of conditions. This test indicates the relative size of metal-component crystallites and the availability of catalytic surface and has been found to be a good measure of catalyst activity. High carbon-monoxide adsorptivity indicates high catalytic activity.

The results of the activity tests, and the determinations of crystallite size and carbon-monoxide adsorption are shown in the following table:

Table I

|  | Without $NO_2$ Treating | With $NO_2$ Treating |
| --- | --- | --- |
| Toluene Yield, Vol. percent | 1.2 | 2.8 |
| Crystallite Size, A | 150 | 15 |
| CO Adsorption, Moles CO/Mol Pt | 0.186 | 0.780 |

In addition, a distinct color change was observed between the two portions of catalyst: the sample not treated with $NO_2$ exhibited a light blue color, whereas, the $NO_2$-treated sample was pure white. This is significant for it indicates a definite change in the state of the metal component, which change is belived to indicate a change in crystallite size, a change in oxidation state and/or association with the other components, and therefore, a more active catalyst.

EXAMPLE II

A sample of an alumina-cobalt oxide-molybdenum oxide-halogen catalyst comprising about 2% cobalt, about 6% molybdenum, and 0.7% combined chloride was subjected to an activity test which involves passing a standard hydrocarbon charge stock over said catalyst in an atmosphere of hydrogen at a temperature of 700° to 750° F., a liquid hourly space velocity of 3.0, and under a pressure of 800 p.s.i.g. The degree of catalyst activity is relative to the amounts of sulfur and nitrogen (basic) removed from the hydrocarbon, and to the decrease in the bromine number.

A second sample of said cobalt oxide-molybdenum oxide catalyst was treated by the method of the present invention as described in Example I, and then subjected to the activity test for determination of sulfur and nitrogen removal, and the degree of decrease in the bromine number.

The cobalt oxide-molybdenum oxide catalyst exhibited a color change when treated by the method of this invention: the untreated sample was dark blue, whereas the $NO_2$-treated sample was light blue. In addition, the catalyst samples were analyzed for the carbon deposition resulting from the activity test. Obviously, there is a distinct advantage in a catalyst which is more active, and at the same time has deposited thereon a lesser amount of carbonaceous material.

The results of the activity tests are given in the following table in which the benefits obtained by the method of the present invention are readily ascertained.

Table II

|  | Without $NO_2$ Treatment | With $NO_2$ Treatment |
| --- | --- | --- |
| Nitrogen, Basic, p.p.m | 2–4 | 1.2 |
| Sulfur, Wt. percent | 0.01 | 0.003 |
| Bromine Number | 1.0 | 0.1 |
| Carbon Deposition, Wt. percent | 1.40 | 0.71 |

EXAMPLE III

A third portion of the platinum-alumina-chloride catalyst which was made in the manner defined in Example I, was treated by the method of this invention in which said catalyst sample was placed in a furnace tube and subsequently brought to a temperature of 500° C. A stream of $N_2O_4$ was passed through the furnace tube at a rate of 50 cc./min. for a period of about five minutes, and followed by a stream of air at a temperature of 500°

C. for a period of one hour to remove traces of $N_2O_4$. The catalyst was then subjected to a reducing treatment in an atmosphere of hydrogen for a period of one hour. The furnace tube was then cooled, the catalyst was removed and further subjected to the activity test as hereinbefore described in Example I. Said activity test yielded results similar to those shown in Table I. Also, a distinct color change was observed, the change being from the light blue of the untreated portion to a pure white of the treated portion.

EXAMPLE IV

A platinum-alumina-bromide catalyst was made using calcined spheres prepared in Example I. 130 grams of the calcined spheres were soaked in 240 milliliters of a water solution of bromoplatinic acid.

The impregnated catalyst was dried at a temperature of 500° C., and oxidized in air at a temperature of 500° C. The platinum-alumina-bromide catalyst was composed of 0.92% bromide and 0.75% platinum, based on the weight of alumina.

A sample of the platinum-alumina-bromide catalyst which was made as described above, was treated with $NO_2$ by the method of the present invention as hereinbefore defined in Example I. There was observed a distinct color change from a dark grey-brown of the untreated catalyst to a light tan of the $NO_2$-treated catalyst. As previously stated, a color change of this nature is indicative of a more active state of the metal component.

EXAMPLE V 104 grams of calcined spheres prepared in the manner described in Example I were soaked in 180 milliliters of a water solution of 30.8 grams of nickel nitrate. The impregnated catalyst was dried at a temperature of 500° C., oxidized in air at a temperature of 500° C., and reduced in a stream of hydrogen at a temperature of 500° C.

A sample of the catalyst made as described above was subjected to tahe action of $NO_2$ by the method of this invention as defined in Example I. Prior to this treatment, this catalyst exhibited a green-black color which, after $NO_2$ treatment, changed to light green. As hereinbefore stated, this color change indicates a change in the state of the metal component, which change indicates a decrease in crystallite size, a change in oxidation state, and/or association with other components, and therefore, a more active catalyst.

EXAMPLE VI 104 grams of calcined spheres prepared by the method described in Example I were soaked in 170 milliliters of a water solution of 8.18 grams of silver nitrate. The impregnated catalyst was dried at a temperature of 500° C., oxidized in air at a temperature of 500° C., and reduced in a stream of hydrogen at a temperature of 500° C.

A sample of the catalyst, made as described above, was subjected to the action of $NO_2$ by the method of the present nvention as defined in Example I. The catalyst exhibited a dark grey color prior to treatment, whereas the color became white after treatment. This color change is indicative of a more active state of the metal component.

EXAMPLE VII 104 grams of calcined spheres prepared by the method described in Example I were soaked in 180 milliliters of a water solution containing 19.8 grams of copper nitrate. The impregnated catalyst was dried at a temperature of 500° C., oxidized in air at a temperature of 500° C., and reduced in a stream of hydrogen at a temperature of 500° C.

A sample of the catalyst made as described above, was subjected to the action of $NO_2$ by the method of the present invention as defined in Example I. The color of the catalyst before treatment was dark green: after $NO_2$-treatment, the color of the catalyst was light green. As hereinbefore stated, this color change denotes a more active state of the metal component.

EXAMPLE VIII

A sample of the calcined spheres, prepared as in Example I, was treated with chloroplatinic acid to yield a catalyst comprising 0.76% by weight of platinum. The catalyst was evaporated to dryness at a temperature of 99° C. over a water bath, and further dried in a rotary drier at a temperature of 200° C. for a period of 3 hours. The dried catalyst was divided into two portions, the first of which was treated by the method of the present invention at a temperature of 300° C. utilizing a stream of NO gas at a rate of 50 cc./hr. The NO-treated first catalyst portion was then subjected to a sweeping treatment with a stream of nitrogen to remove traces of the nitric oxide. The catalyst temperature was increased to 500° C., and a stream of air passed therethrough for a period of one hour.

The second dried catalyst portion was subjected only to the air-oxidation treatment effected at a temperature of 500° C. for a period of one hour. The two catalyst portions were subjected individually to a particular stability test which comprises passing a standard hydrocarbon charge stock through the catalyst at a liquid hourly space velocity of 2.0 in an atmosphere of hydrogen present in a mol ratio of hydrogen to hydrocarbon of 6:1. The reaction zones were maintained at a temperature of 500° C. and under an imposed pressure of 500 p.s.i.g. for a period of twenty hours. The reaction zones were cooled and depressured, and the two catalyst portions removed and analyzed for carbon deposition which is an indication of the stability of a particular catalyst. Quite often, highly active catalysts will yield excellent results initially, but are insufficiently stable, and rapidly lose their capacity to function acceptably for prolonged periods of time. The air-oxidized catalyst portion contained 1.79% by weight of carbon, whereas the NO-treated catalyst contained only 1.15% by weight of carbon.

EXAMPLE IX

Example VIII was repeated utilizing $NO_2$-treatment of the dried catalyst, and subjecting the thus treated catalyst to the stability test previously described. The $NO_2$-treated catalyst was analyzed, and found to contain 1.39% by weight of carbon.

EXAMPLE X

A platinum-alumina-chloride catalyst, prepared as hereinbefore described in Example I, is treated in accordance with the method of this invention by subjecting said catalyst to the action of $N_2O_5$ in a furnace tube at a temperature of 500° C. Since, at ordinary conditions, $N_2O_5$ is a solid, it is placed in a suitable container and brought to a temperature at which vaporization of the $N_2O_5$ takes place. A stream of any suitable inert gas, such as nitrogen, is passed through the container, and then into the furnace tube carrying vaporized $N_2O_5$ with it. The catalyst is further subjected to a stream of air at a temperature of 500° C. to remove traces of $N_2O_5$, and, thereafter, further subjected to a stream of hydrogen at a temperature of 500° C. for a period of one hour.

The furnace is cooled, and the catalyst, the metal component of which is in a more active state, is removed.

EXAMPLE XI

A platinum-alumina-chloride catalyst prepared as hereinbefore described in Example I is placed in a furnace tube and brought to a temperature of 500° C. The catalyst is then subjected to the method of the present invention by the action of $N_2O_3$ which is introduced into the furnace tube by passing a stream of any suitable inert gas such as nitrogen through a vessel containing $AsO_3$ and $HNO_3$, the reaction of which produces $N_2O_3$, and then into said furnace tube. After a period of five minutes, a stream of air at a temperature of 500° C. is passed through the tube for a period of one hour to remove all traces of $N_2O_3$. Thereafter, said catalyst is subjected to a stream of hydrogen at a temperature of 500° C. for a period of one hour.

The furnace tube is cooled, and the catalyst, the metal component of which exhibits a smaller crystallite size, is removed.

It is readily seen, from the foregoing examples, that the method of the present invention provides a means of producing and insuring highly active catalyst, whatever the method of manufacture, and eliminates unnecessary high costs resulting from the criticalness inherent in manufacturing processes, activity testing, and reprocessing procedures.

I claim as my invention:

1. A method for activating a dry catalytic composite of an alumina-containing refractory inorganic oxide support and at least one metal from groups VI and VIII of the periodic table, which comprises passing an oxide of nitrogen through said catalytic composite at a temperature within the range of from about 25° C. to about 1000° C., and thereafter oxidizing said catalytic composite in an atmosphere of air, reducing the oxidized composite with hydrogen, the oxidation and reduction being successive treatments at temperatures within the aforesaid range.

2. The method of claim 1 further characterized in that said oxide of nitrogen is NO.

3. The method of claim 1 further characterized in that said oxide of nitrogen is $NO_2$.

4. The method of claim 1 further characterized in that said oxide of nitrogen is $N_2O_4$.

5. The method of claim 1 further characterized in that said oxide of nitrogen is $N_2O_3$.

6. The method of claim 1 further characterized in that said oxide of nitrogen is $N_2O_5$.

7. The method of claim 1 further characterized in that said composite is contacted with the oxide of nitrogen in the presence of halogen in an amount in excess of 0.01% by weight, but not above about 8.0%.

8. The catalytic composite of claim 1 further characterized in that said composite is an alumina containing refractory inorganic oxide support combined with cobalt and molybdenum.

9. A method for activating an alumina-platinum catalytic composite containing halogen in an amount in excess of 0.01% by weight, but not above about 8.0%, calculated as the element, which comprises passing an oxide of nitrogen through said catalytic composite at a temperature within the range of from about 25° C. to about 1000° C., removing said oxide of nitrogen by sweeping the composite with air at the aforesaid temperature and thereafter subjecting said catalytic composite to reduction with hydrogen at a temperature within the aforesaid range.

10. The method of claim 9 further characterized in that the oxide of nitrogen is passed through said catalytic composite at a temperature within the range of from about 25° C. to about 600° C.

References Cited in the file of this patent

UNITED STATES PATENTS

| | | |
|---|---|---|
| 1,923,652 | Winkler et al. | Aug. 22, 1933 |
| 2,209,458 | Heard et al. | July 30, 1940 |
| 2,566,521 | Haensel | Sept. 4, 1951 |
| 2,581,228 | Bailey et al. | Jan. 1, 1952 |
| 2,781,324 | Haensel | Feb. 12, 1957 |